3,794,705
METHOD FOR REMOVAL OF FLUIDIZED BED PARTICLES FROM EXTRUDED POLYMERIC PRODUCTS PROCESSED THEREIN
Robert E. Harley, Tallmadge, Ohio, assignor to The General Tire & Rubber Company
Original application Nov. 9, 1970, Ser. No. 87,669, now abandoned. Divided and this application Sept. 13, 1972, Ser. No. 288,865
Int. Cl. B29c 25/00, 29/00; B29h 19/00
U.S. Cl. 264—37        4 Claims

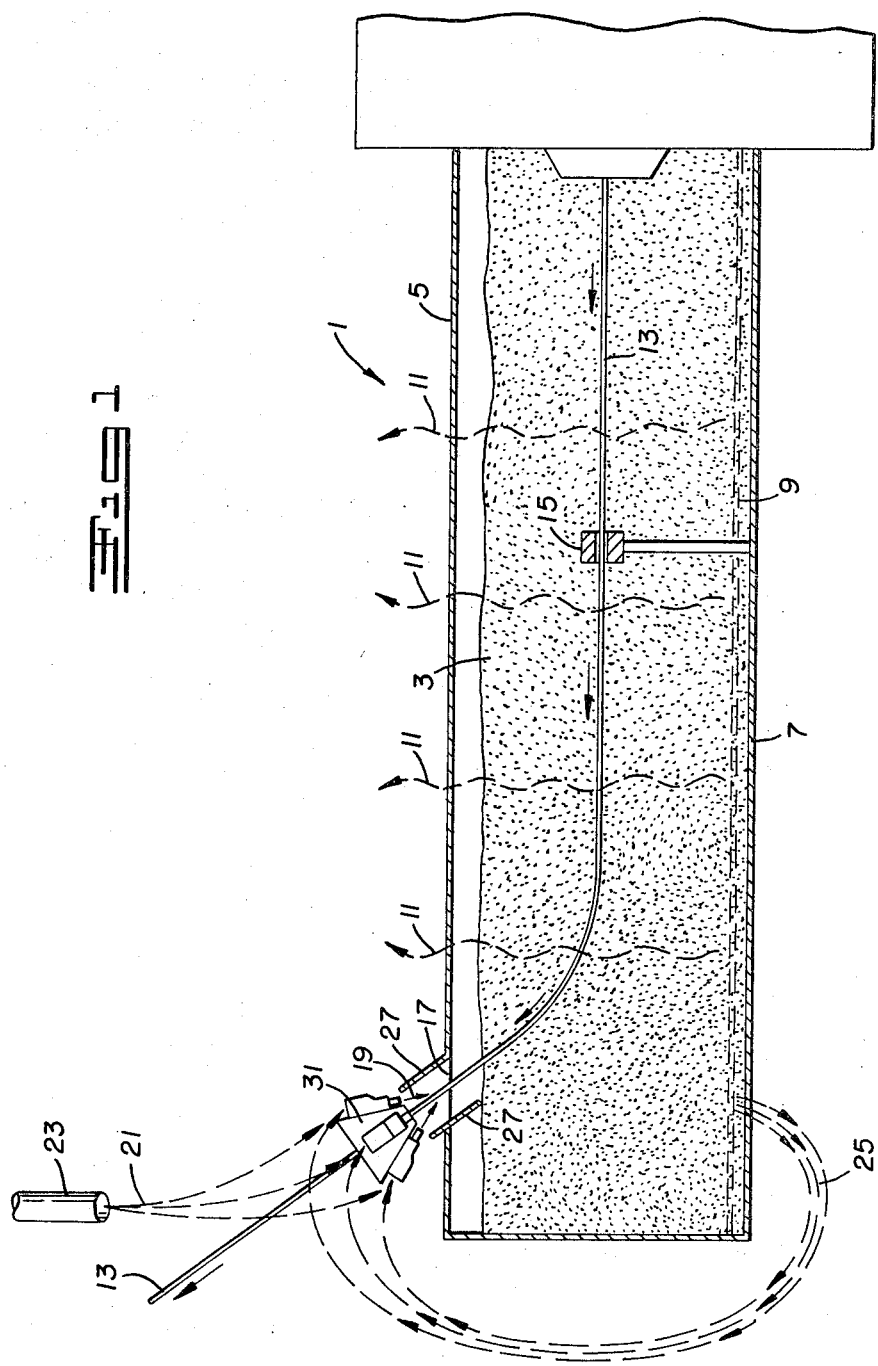

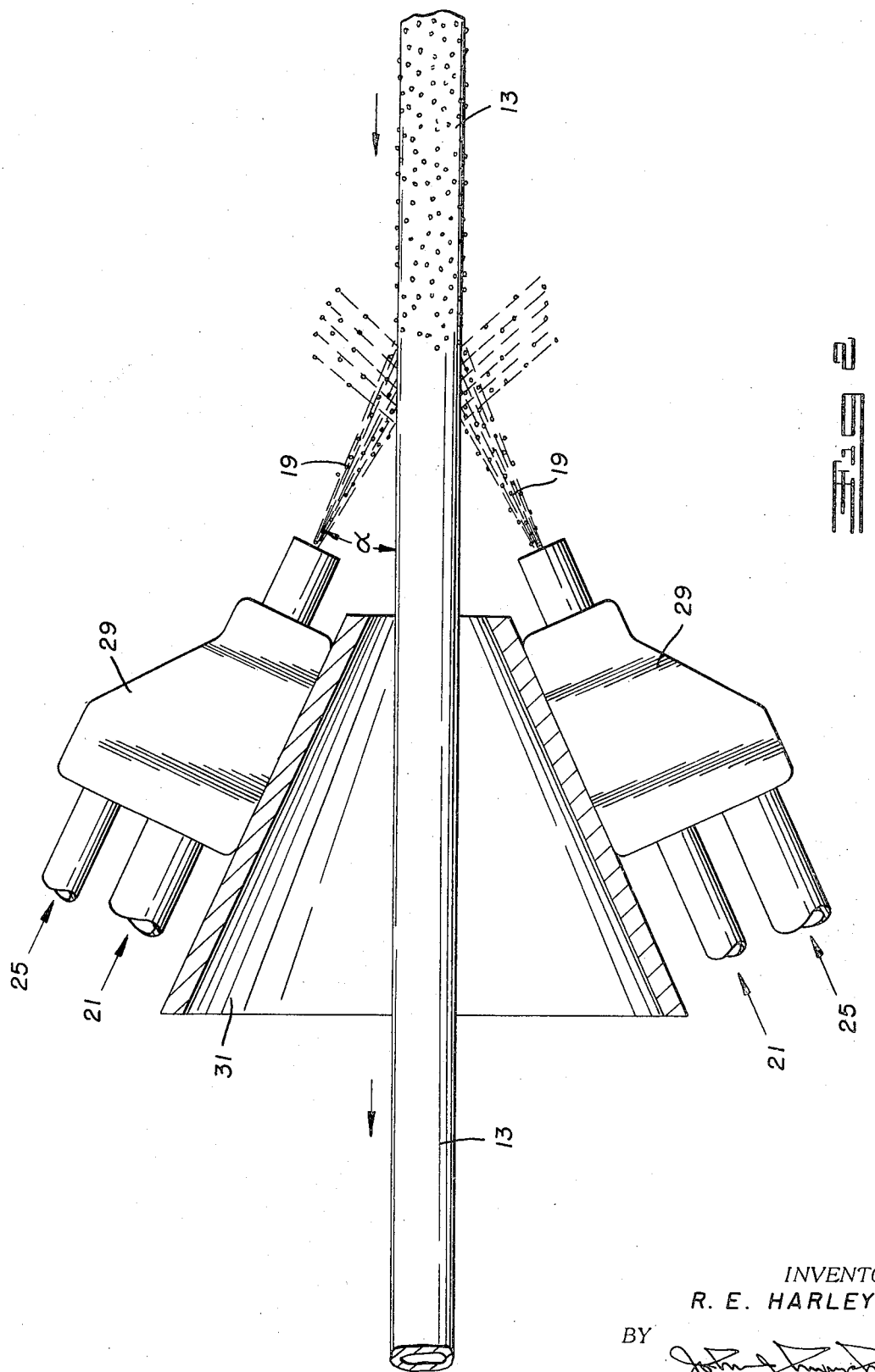

ABSTRACT OF THE DISCLOSURE

In processing, i.e., heating, cooling, or vulcanizing, extruded polymeric products in fluidized beds, particles from the bed stick to the surface of the product. These particles cause problems in subsequent handling and finishing. Present methods of removing these adhered particles include air blasting, rubbing, and brushing the surface; rubbing and brushing damage the product's surface whereas air is rather inefficient and causes contamination of the bed. This invention provides an efficient process for removing the particles and that does not damage the surface of the product by directing at an angle of about 25° to 30° a stream of an elastic fluid such as air and fluidized bed particles against the surface of the oncoming extruded product.

CROSS-REFERENCE TO RELATED APPLICATION

This application is a division of prior copending United States patent application Ser. No. 87,669, filed Nov. 9, 1970, entitled "Method and Apparatus for Removal of Fluidized Bed Particles From Extruded Polymeric Products Processed Therein," and now abandoned.

BACKGROUND OF THE INVENTION

Field of the invention

This invention relates to the field of fluidized beds. More particularly, this invention relates to fluidized bed operations in processing extruded polymeric products.

DESCRIPTION OF THE PRIOR ART

In the art of extruding polymers, fluidized beds have found limited use for heating, cooling, and vulcanizing the extruded products. The overall process generally involves placing a fluidized bed at the exit of an extrusion device and introducing the extruded product into the bed and conveying it therethrough to effect heating, cooling or vulcanizing. Fluidized beds have been found uniquely qualified for this type of operation. Extrusions usually have intricate surface geometries and the fluidized particles easily conform to these varied surface features to efficiently transfer heat. Thus, the combination of a fluidized bed and an extruder permits continuous production of varied shaped extruded polymeric products wherein vulcanizing, cooling, curing, and other heat-transfer operations are involved.

In the use of fluidized beds with extruded polymeric products a problem has arisen wherein particles from the bed become adhered to and sometimes partially embedded in the surface of the extruded product and remain in adherence as the product leaves the bed. This is especially true with elastomeric products where the unvulcanized extrusion has a rather sticky surface. Without removal, these particles cause problems in subsequent processing such as where the product is flocked, i.e., coated with a layer of adhesive and sprayed with short fibers. The particles may become dislodged in handling and, if not removed prior to the flocking process, portions of the flock adhesive will loosen and the flock itself will separate from the surface. In other respects, such as where the product is to be painted or otherwise decorated, the adhered particles are potential areas of lost finish. Still further, machines and other elements in contact with the extruded product are damaged by the abrasive nature of the particles and the coaction of the particles and the machines results in damage to the surface of the product as well.

Presently, these adhered particles are removed by air blast either alone or in combination with brushing or rubbing the surface of the extruded product after it leaves the fluidized bed. Air blasts have proven to be rather inefficient. Rubbing and brushing the surface of the product will remove most of the adhered particles; however, because freshly extruded polymeric products usually have tender surfaces, the rubbing and brushing often produces rips, nicks, and tears.

Shot-blasting has been used to remove unwanted materials from the surface of certain products; however, by and large, it is concerned with removing hard material from hard surfaces, such as rust from steel parts. Glass beads have been used as blasting material for hard finished molds, see Plastics Design & Processing, May 1970, page 18, et seq., and to achieve ornamental effects on plastic sheets in the semi-plastic state, see U.S. Pat. 2,448,316. The shot-blasting art teaches the re-use of shot-blasting media, i.e., the particulate material; however, it has taught away from using the removed matter as shot-blasting material itself because the removed matter is usually of such small size and so lightweight that it cannot be imparted with sufficient momentum to enable it to efficiently remove further matter, see United States Pat. 1,829,599. This generally explains why, in a shot-blasting operation, the scrap or removed matter is separated by screens or other devices from the shot-blasting material before it is recycled.

A short-blasting operation in connection with fluidized bed processes would ostensibly appear not to be desirable as the shot particles would contaminate the fluidized bed and deteriorate the process being carried on in the bed. Furthermore, it would appear from the teachings of the prior art that the fine particles in the fluidized bed could not be used as shot-blasting media as they cannot be imparted with a great deal of momentum. Still further, shot-blasting as applied to a soft product vis-a-vis the hard metallic surfaces to which it is generally applied would appear to present problems in damage to the soft surface upon impingement of the high velocity particles.

It was surprising, therefore, to discover that small particles such as those from the fluidized bed, could be mixed in a nozzle with an elastic fluid such as air and used as a shot-blasting stream against the surface of the extruded polymeric product to efficiently remove the adhering particles without causing damage to the fragile surface. This may be done, however, only when the stream is directed against the surface at a rather precise angle. This use of fluidized bed particles in conjunction with an elastic fluid, particularly the same fluid used to fluidize the bed, permits the impinging particles and the removed particles to drop back into the fluidized bed without contaminating the bed so that there need be no separation of material. The extruded product then leaves the apparatus in a clean condition and without any surface damage.

Therefore, the main object of this invention is a method and apparatus for efficiently removing adhering fluidized bed particles from the surface of extruded polymeric products that have been processed therein. Other objects include a method and apparatus for removing adhered fluidized bed particles without incurring contamination of the fluidized bed; that accomplish the removal without damage to the fragile surface of the extruded product;

and that are easily adaptable for automatic and semi-automatic, continuous and discontinuous operations. These and other objects will become more apparent to the reader upon reading the Description of the Preferred Embodiment in conjunction with the attached drawings.

SUMMARY OF THE INVENTION

This invention concerns a method and apparatus for removing fluidized bed particles from the surface of an extruded polymeric product that has been processed in a fluidized bed comprising directing a stream comprising an elastic fluid and fluidized bed particles against the surface of the extruded product at an angle of about 25° to about 30° between the major axis of the stream in the flowing direction and the major axis of extruded product in the oncoming direction, wherein the stream impinges and dislodges the adhered fluidized bed particles.

DESCRIPTION OF THE DRAWINGS

FIG. 1 is a side view, partially in schematic, of one embodiment of the apparatus of this invention for combination with an extrusion device or fluidized bed showing the path of the extruded product as it proceeds through a portion of the fluidized bed and through a series of nozzles for removal of the adhered particles.

FIG. 2 is a close-up side view of a portion of the apparatus shown in FIG. 1 showing the nozzles and their position with respect to the advancing extruded product.

DESCRIPTION OF THE PREFERRED EMBODIMENT

This invention is for use with extruded polymeric products that are processed in fluidized beds. Extrusion is a well-known process and applicable to the wide range of polymeric materials. As applied to this invention "extrusion" generally involves forcing a viscous polymeric composition either alone or in combination with other materials such as rope, wire or paper, through an aperture to form an elongated product having substantially the same cross-sectional configuration as the aperture. The forcing may be accomplished by mechanical or hydraulic means and the aperture may range from a small hole to a long slit. Examples of extruders usable herein are the ram type, the spinneret type, and the screw type.

By "processed in a fluidized bed" is meant that the extruded polymeric product may be heated, cooled, or chemically altered in the fluidized bed. Fluidized bed heating and cooling is already used in the extrusion of polychloroprene rubber compounds. Chemical alteration may take the form of vulcanization, such as is described in U.S. Pat. 3,072,968, crosslinking, or curing.

By "polymeric" is meant plastics, elastomers, and mixtures thereof. Plastics may be thermosetting or thermoplastic or mixtures of the two; elastomers may be natural or synthetic or mixtures of the two; and mixtures of plastics and elastomers may involve blends of any of these polymers.

With respect to extrudable plastics, thermoplastics such as acrylonitrile-butadiene-styrene, acetals, acrylics, amino resins, cellulosics, fluorocarbons, polystyrene, polyamides, polycarbonate, polyethylene, polypropylene, polyvinyl halides and mixtures thereof, thermosetting plastics such as alkyd resins, epoxy resins, phenolics, polyesters, polyurethanes, and mixtures thereof, as well as mixtures of thermoplastics and thermosetting plastics comprise some non-limiting examples. Examples of extrudable elastomers include natural rubber, acrylics, butadiene-styrene rubbers, polychloroprene, chlorosulfonated polyethylene, fluorocarbon rubbers, isobutylene-isoprenes, isoprene and butadiene rubbers, nitrile-butadiene rubbers, polyisobutylenes, polysulfide rubbers, silicones, and polyurethane rubbers. Elastomers and plastics may be blended into extrudable compounds such as polystyrene-butadiene rubber, polyurethane rubber-polyamide, polyethylene-butadiene rubber, etc.

These extrudable polymeric materials may contain other compounds that give special properties such as accelerators, activators, retarders, vulcanizing agents, antioxidants, antiozonants, inhibitors, chemical stabilizers, plasticizers, softeners, peptizers, processing aids, dispersing agents, tackifiers, fillers, carbon blacks, fibers, inorganic and organic colorants, dusting agents, dipping agents, finishes, lubricants, adhesives, bonding agents, blowing agents, blowing promoters, odorants, antistain agents, emulsifiers, catalysts, modifiers, extenders, shortstops, solvents, etc.

Specifically with respect to elastomers and elastomeric compounds, this invention is particularly adaptable to extruded sponge rubber products such as welts, gaskets, door guards, weatherstripping, etc. These extruded materials have very fragile surfaces and are easily damaged after extrusion during heating, cooling, or vulcanizing. The use of a fluidized bed has proven of great value with these products as they are not damaged by the bed particles. To obtain a sponge structure, a blowing agent and possibly a blowing promoter are added to the compound. Examples of the former include ammonium bicarbonate; biuret and urea compounds; p,p'-oxybis(benzenesulfonylhydrazide); 1,3-diphenyl-triazene; and azodicarbonamide; examples of the latter include surface-coated urea and silicone-glycol copolymers.

The apparatus of this invention is useful in combination with an extruder-fluidized bed machine of the type generally described in U.S. Pat. 3,072,968 and as further described in Rubber World, October (1962), pp. 82–85 both of which are incorporated by reference herein. These machines generally comprise a means for continuously extruding a polymeric product, a bed of particles of finely divided solid material disposed adjacent the outlet of the extrusion means, means for fluidizing and heating or cooling the bed of particles, and means for conveying the continuously extruded polymeric product through the hot or cold fluidized bed. The apparatus of this invention comprises at least one nozzle preferably positioned adjacent the exit of the fluidized bed adapted to deliver a stream comprising an elastic fluid and fluidized bed particles against the surface of the exiting processed polymeric product such that the angle to the major axis of extruded product in the oncoming direction is between about 25° to 30°.

Referring now to the drawings, wherein like elements are identified with like numerals throughout the two figures, FIG. 1 shows a side view, partially in schematic, of one embodiment of this invention. In the figure is shown fluidized bed 1 which comprises bed of particles 3 of finely divided solid material housed in nonporous sides 5 and nonporous bottom 7. Bed 3 may be horizontally or vertically disposed; it is shown here as horizontally disposed. Inside bottom 7 and spaced slightly apart therefrom is sparge plate 9 which is a porous plate or surface wherein an elastic fluid (not shown) is introduced under pressure from a source beneath (not shown) and percholates upward as shown by dotted line arrows 11 through bed 1 to fluidize particles 3.

The term "elastic fluid" is used herein to denote gases and steam. Examples of gases include air, nitrogen, carbon dioxide, etc., while the steam may be superheated, saturated, or of lower quality.

Progressing from the right side of fluidized bed 1 is extruded polymeric product 13 shown here as exiting either an extruder or another portion of fluidized bed 1. Product 13 progresses toward the left while being processed in bed 1, i.e., heated, cooled, vulcanized, etc. and passes through conveying means 15 which may be a ceramic guide ring mounted on bottom 7. Other conveying means are available such as troughs and pulleys. As product 13 progresses through particles 3 some of them stick to its surface and are carried along as it (product 13) leaves fluidized bed 1 through exit 17.

As it leaves exit 17, product 13 (with its adhered particles) comes into contact with stream 19 that is comprised of elastic fluid 21 from fluid source 23 and bed particles 25 from fluidized bed 1. Stream 19 is directed substantially over the entire surface of product 13 and the combination of impinging fluid and particles dislodges the adhered fluidized bed particles therefrom. To recover impinging particles 25 and the adhered particles, stream 19 is preferably aimed downward into exit 17 and shields 27 are disposed thereabout to direct the recovered particles back into fluidized bed 1. Product 13 thereafter progresses to the next process, such as painting, flocking, cutting, etc., free of adhered particles and without surface damage.

In FIG. 2 is a close-up view of the removal of adhered particles by the action of stream 19. Product 13 containing adhered particles is shown progressing from right to left. At least one nozzle 29 and preferably three or more nozzles are positioned about mounting means 31 which comprises a frusto-conical member wherein product 13 passes therethrough from the small opening to the large opening. Nozzles 29 are mounted on the frusto-conical surface so that their streams 19 are directed to the apex of the conical configuration and impinge directly upon product 13 as it passes in the oncoming direction. Other means such as clamps and other mechanical fittings may be used as mounting means 31 and are fully contemplated herein.

Nozzles 29 may be any of a wide range of nozzles that are adaptable to mix and pass bed particles 25 and elastic fluid 21. Particularly preferred in this respect is a nozzle having a 5/16 inch diameter exit aperture wherein the pressure of fluid 21 is maintained between 5 and 20 pounds per square inch gauge. The spray pattern of stream 19 may vary from a concentrated "line" pattern to a fan-shaped pattern depending upon the size and surface geometry of product 13.

Nozzles 29 are positioned on mounting means 31 so that the angle between stream 19 and the major axis of product 13 in the oncoming direction, shown here as "α" is within 25° to 30°. At an angle of less than 25° stream 19 becomes ineffective to remove the adhered particles whereas, at an angle greater than 30°, the particles in stream 19 begin to damage the surface of product 13.

The particles of finely divided solid material in bed 3 and in stream 19 are preferably small solid glass spheres of 0.005 to 0.010 inch in diameter. Other particulate material such as sand may also be used. The size distribution of the particles in bed 3 is kept rather narrow to prevent slugging or channeling of fluid through fluidized bed 1 and to give consistent results in stream 19.

The elastic fluid for fluidizing bed 3 for stream 19 is preferably air or superheated steam. Where fluidized bed 1 is used to cool product 13, the fluid is preferably cold, dry air and fluid 21 is preferably the same. Where heating of product 13 is required, the fluid in bed 3 is preferably superheated steam or hot air and fluid 21 is preferably warm air. When the elastic fluid for stream 19 and for fluidized bed 1 are the same there is no need for separation equipment and the bed does not become contaminated.

The amount of particles 25 in stream 19 may be varied depending upon the amount of particles adhering to product 13. Generally they may be drawn into nozzles 29 with fluid 21 by venturi effect and may be controlled by action of a valve or other restrictive device (not shown).

What is claimed is:

1. In a continuous extrusion process for elastomers and polymers wherein the extrudate is moved through a particulate fluidized bed and then through a cleaning stage the improvement comprising directing during the said cleaning step, a stream comprising an elastic fluid and particles which are continuously withdrawn from said fluidized bed against the surface of said extrudate in a direction generally counter-current to and at an angle of between about 25° and 30° to the direction of movement of said extrudate so that said stream impinges on said extrudate dislodging any particles adhering thereto and the particles portion of said stream is recirculated to said fluidized bed.

2. The process of claim 1 wherein said elastic fluid is air.

3. The process of claim 1 wherein said elastic fluid is steam.

4. The process of claim 1 wherein said stream is under pressure of between about 5 to about 20 pounds per square inch gauge and is sprayed through a 5/16 inch diameter exit aperture.

References Cited

UNITED STATES PATENTS

| | | | |
|---|---|---|---|
| 2,448,316 | 8/1948 | Lesaroy | 425—385 |
| 2,789,804 | 4/1957 | Toulmin, Jr. | 134—7 |
| 3,072,968 | 1/1963 | Watson et al. | 264—Dig. 51 |
| 3,234,596 | 2/1966 | Sims | 264—Dig. 51 |

JEFFERY R. THURLOW, Primary Examiner

J. B. LOWE, Assistant Examiner

U.S. Cl. X.R.

134—7, 37; 264—169, 232, 344, Dig. 51; 425—Dig. 20

PO-1050
(5/69)

UNITED STATES PATENT OFFICE
CERTIFICATE OF CORRECTION

Patent No. 3,794,705                    Dated February 26, 1974

Inventor(s) Robert E. Harley

It is certified that error appears in the above-identified patent and that said Letters Patent are hereby corrected as shown below:

Column 2, line 37, which reads "short-blasting" should read ---shot-blasting---.

Column 6, line 1, which reads "3 for stream" should read ---3 and for stream---.

Signed and sealed this 1st day of October 1974.

(SEAL)
Attest:

McCOY M. GIBSON JR.
Attesting Officer

C. MARSHALL DANN
Commissioner of Patents